United States Patent [19]

Dressel

[11] 4,254,638

[45] Mar. 10, 1981

[54] POSITIVE RELEASE MEANS FOR ARTICULATED FLEXIBLE SHAFT

[75] Inventor: Michael O. Dressel, Englewood, Colo.

[73] Assignee: The Bendix Corporation, Englewood, Colo.

[21] Appl. No.: 948,361

[22] Filed: Oct. 4, 1978

[51] Int. Cl.³ .............................................. F16C 1/02
[52] U.S. Cl. ...................................... 64/2 P; 64/2 R; 64/7; 64/23.5; 175/78; 173/165
[58] Field of Search .................... 64/2 P, 2 R, 23.5, 4, 64/8, 9, 7; 74/250 C, 243 C; 175/223; 173/147

[56] References Cited

U.S. PATENT DOCUMENTS

| | | | |
|---|---|---|---|
| 1,829,392 | 10/1931 | Caldwell | 64/7 |
| 2,926,531 | 3/1960 | Sabatini | 64/23.5 X |
| 3,288,229 | 11/1966 | Chappuis | 64/23.5 X |
| 3,493,057 | 2/1970 | Peterson | 64/23.5 X |
| 4,062,412 | 12/1977 | McIlvanie | 64/2 R X |
| 4,141,225 | 2/1979 | Varner | 64/7 X |
| 4,172,391 | 10/1979 | Dressel | 74/250 C |

Primary Examiner—Henry K. Artis

Attorney, Agent, or Firm—Robert C. Smith; William F. Thornton

[57] ABSTRACT

A flexible shaft is formed of a plurality of linked sections which lock together to provide a rigid shaft when turned in a first direction as for drilling and which, when turned in the opposite direction, unlatch, thereby permitting limited relative movement of the sections so that they may follow a curved path for storage. As the sections are rotated in the first direction, certain internal notches of one section and mating external projections of the next section tend to wedge together and then do not always separate easily and readily when the torque on the shaft is reversed. A pair of cam members including ramp surfaces are incorporated into a collar through which the shaft passes such that when the shaft is driven axially in the direction to effect drilling, slots in the shaft sections passing over ramp surfaces on the key members are rotated a small amount to cause the slots and projections to latch together, and when the shaft is moved axially in the opposite direction, the slots passing the ramp surfaces are positively driven radially in a direction to break loose any wedged-together sections.

7 Claims, 12 Drawing Figures

FIG. 5
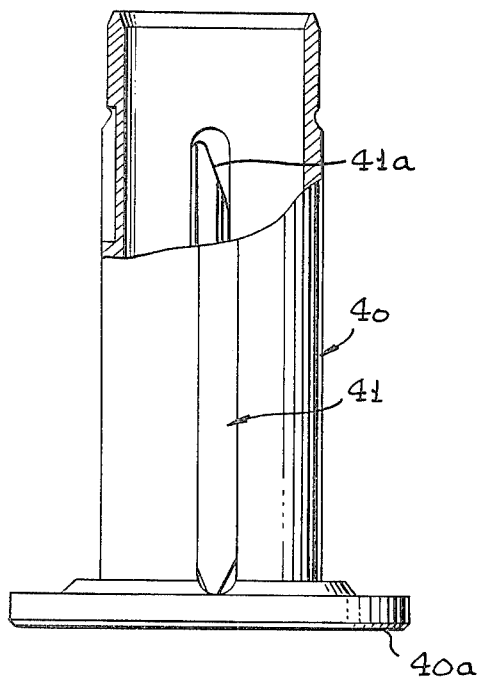
FIG. 6
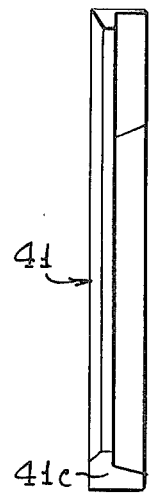
FIG. 7
FIG. 8
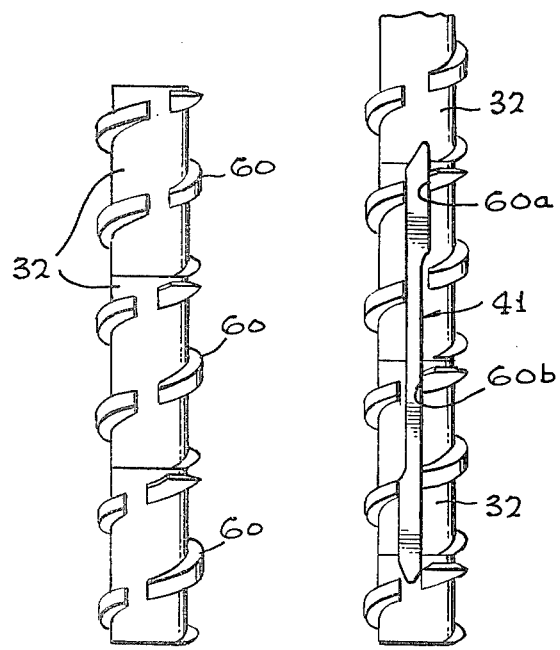
FIG. 9
FIG. 10
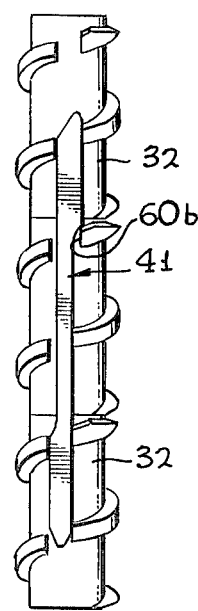
FIG. 11
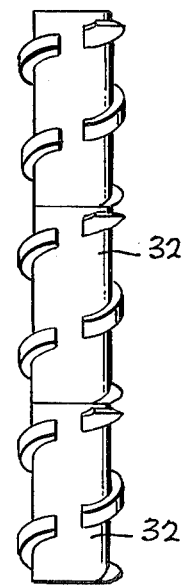

POSITIVE RELEASE MEANS FOR ARTICULATED FLEXIBLE SHAFT

BACKGROUND OF THE INVENTION

The use of a flexible drill assembly for operating in the coal mining industry is relatively new. The flexible drill provides a compact drill unit which can be installed in locations having very little space. Such drill shaft may be much shorter than the height of a man, and the drill string which consists of a series of interconnected drill sections or links is contained in a flexible guide tube which can be easily stored. The use of this type of drill string makes it possible to use a solid drill shaft of much greater length than the height of the mine shaft. One characteristic of this type of drill string is that each drill section consists of a ball and socket or universal type of connection which is articulated when the drill is rotated in one direction such that it can move over a limited angular range, and when the drill is turned in the opposite direction the drill sections lock together to create a straight solid shaft. When the drill has been in operation for some time, the drill sections tend to lock together rather tightly, and there is some concern that on withdrawal of the drill shaft, even with some sections reversed, torque applied may fail to release from each other, thereby tending to damage or score up the curved flexible guide tube through which the sections are conveyed to transfer them from vertical to horizontal storage.

SUMMARY OF THE INVENTION

The drill drive head consists of structure which is capable of rotating the drill shaft and also carrying the connected, vertically oriented links or sections axially in either the forward feeding direction for active drilling or the reverse direction for withdrawal of the drill shaft. The operator may select the proportion of axial and rotational movement as desired, within limits. A drive structure suitable for this purpose is described in U.S. Pat. application Ser. No. 831,727 filed Sept. 9, 1977, in the name of the inventor named herein and assigned to The U.S. Government.

To insure that the drill sections are caused to separate from each other upon withdrawal and to lock up as desired for drilling, it is desirable to provide means which will positively rotate the sections relative to each other in both directions and particularly in the direction to unlock or break the individual sections loose from each other as they separate from the drive head and enter the arcuate flexible guide tube. Applicant has designed a collar structure which guides the drill shaft into the drive head consisting of a hollow cylindrical member through which the drill sections pass including a pair of cam surfaces which make contact with notches or projections on the drill sections and positively rotate the sections relative to each other those few degrees in one direction to cause them to lock together and a corresponding few degrees in the opposite direction to break loose any joints which may fail to become unlatched through being rotated in the direction which should normally cause such unlatching. These cam members are preferably positioned 180° apart on the inside of said collar structure and mate with notches on the sections, serving to guide the drill sections as they move axially through the collar structure. A short distance prior to leaving the collar structure in either direction, the notches on the sections contact ramp surfaces on the cam members causing a slight rotation of each section relative to the one following.

DESCRIPTION OF THE DRAWINGS

FIG. 5 is a plan view, partly in section, of the collar assembly of FIG. 3;

FIG. 6 is an elevation of one of the cam members incorporated into the collar assembly of FIGS. 3, 4 and 5;

FIG. 7 is a plan view of the cam member of FIG. 6.

FIGS. 8–11 are a series of schematic drawings showing progressive positions of the drill shaft as it is moved by the cam surfaces.

DESCRIPTION OF THE PREFERRED EMBODIMENT

Figure 1:
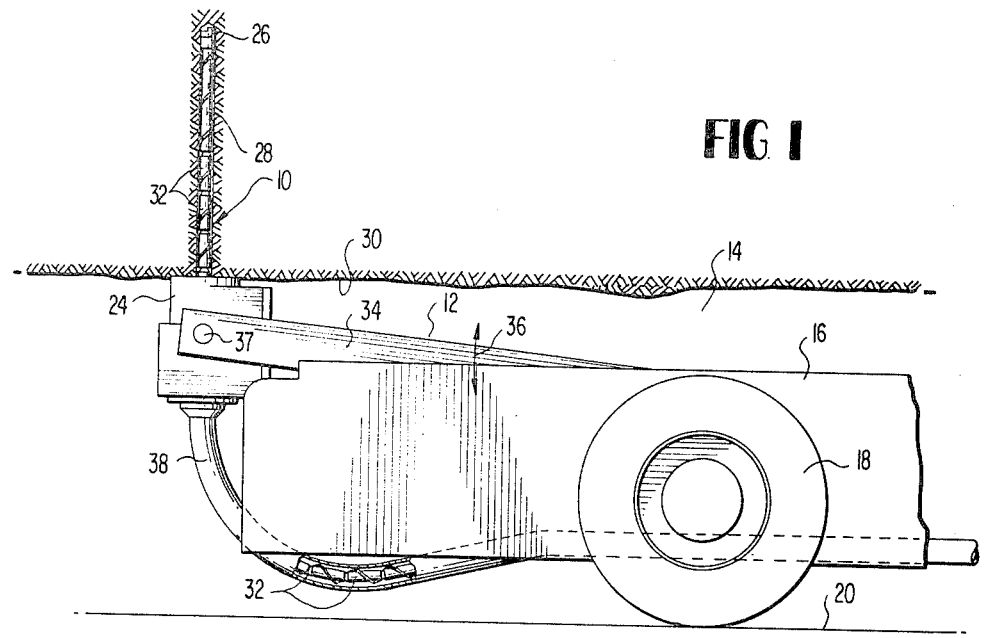
FIG. 1 is a vertical elevation, partially in section, of a mine drilling machine employing a vertically oriented drill head for drilling roof bolt holes in underground mines using a rotary drill incorporating an articulated flexible shaft assembly with axially lockable universal joints.

Reference to FIG. 1 shows an articulated, flexible shaft assembly with axially lockable universal joint indicated generally at 10 as being employed in conjunction with a mining machine 12 employed in the drilling of roof bolt holes in an underground mine 14 which may be of the general height of a seam of coal or the like, the machine 12 having an overall vertical height somewhat less than that of the mine 14 and consisting of a chassis 16 mounted for movement on wheels 18 over the floor 20 of the mine 14. Mounted to the forward end of the chassis 16 is a drill drive head 24 for driving the articulated, flexible shaft assembly 10 which passes through the center of drill head 24 for rotation about a vertical axis, the articulated, flexible shaft assembly 10 terminating at one end in a drill bit 26 which is shown as having formed a vertical hole 28 within the mine roof 30. Shaft assembly 10 comprises a number of articulated shaft sections 32 which are mechanically linked together. The drill head 24 is mounted to the chassis 16 by way of paired arms 34 and a horizontal pivot axis defined by pins 37 fixed to the drill head 24 and rotatably projecting horizontally through the ends of arms 34. A mechanism (not shown) may be employed for raising and lowering the head 24 relative to the mine roof 30 by pivoting the arms 34 as indicated by a double-headed arrow 36. A curved tube 38 depends from the bottom of the head 24 and extends rearwardly through the chassis 16, the tube 38 being broken away to illustrate the linked articulated shaft sections 32 which extend from the drill bit 26 by way of starter element 27 through the rotary drill drive head 24 and through a given length of tube 38 depending upon the desired vertical height of the drilled hole 28 within the mine roof.

The articulated flexible shaft assembly will lock up straight when torqued in a clockwise direction as seen from the drill 24 facing drill bit 26 and will freely articulate when torqued in a counterclockwise direction. Thus, the articulated flexible shaft assembly allows the drill (formed by the articulated shaft sections and the drill bit) to operate as a strong straight drill above the drill drive head 24 to produce a straight verticle hole as at 28 in the mine roof (for example) while the opposite end of the drill (that is, that portion of the articulated flexible shaft assembly 10 beneath the drill drive head 24) rides in the curved tube to clear the floor 20 of a low coal mine. Since this portion of the drill is horizontally oriented in the mine, the length of the drill is unimportant from a clearance standpoint. The minimum vertical height required for the operation of the drill with the flexible shaft assembly is a function of the drive head height, the allowable articulation angle of the flexible shaft section joints, and the length of each drill or shaft section from joint center line to joint center line.

Figure 1A:
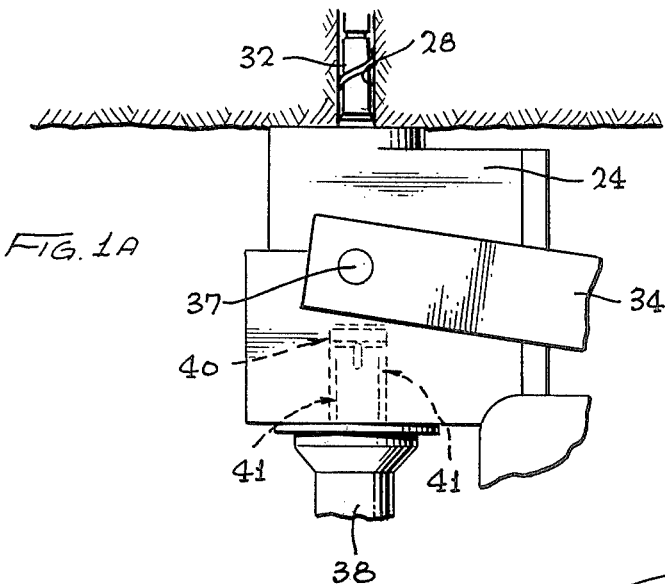
FIG. 1A is an enlarged view of a portion of FIG. 1 with my collar and cam assembly shown in dotted outline.

FIG. 1A is an enlarged portion of FIG. 1 including the drill head 24, pivot pins 37 which carry drill head 24 at the ends of arms 34 and a portion of the curved tube 38. Shown in dotted outline at the top of tube 38 is a collar member 40 which carries a pair of cam members 41, discussed in detail below.

Figure 2:
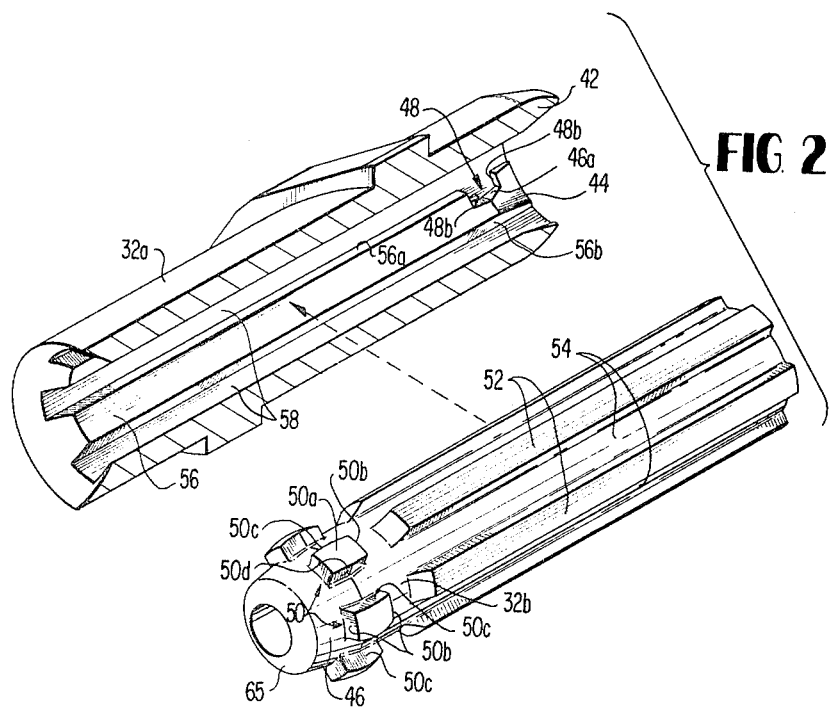
FIG. 2 is an exploded perspective view, partially in section, of a typical two-part shaft section of the multiple section flexible shaft assembly of FIG. 1.

FIG. 2 is an exploded perspective view, partially in section, showing one of the shaft sections 32 which are of two-part construction; that is, they each comprise an outer sleeve member 32a and an inner core member 32b. The outer sleeve member 32a terminates at one end in a socket member 42 which includes a spherical inner surface 44 which faces a ball member 46 forming a spherical end portion of core member 32b for the adjacent shaft section 32. The ball and socket members 42 and 46 define a universal joint which, as mentioned previously, is selectively locked so that the shaft sections are in axial alignment and form a straight shaft portion such as that illustrated within the drilled hole 28 in FIG. 1 during rotation in one direction, or are in free universal joint condition permitting angular orientation of the adjacent shaft sections (as seen within that portion of tube 38 shown broken away in FIG. 1) when rotated in the opposite direction. The socket member 42 is provided with internal locking/driving pockets indicated generally at 48 (FIG. 2) while the ball member 46 of core member 32b is provided with a plurality of male locking/driving lugs indicated generally at 50 which comprise radial projections and whose radially outwardly disposed surfaces 50a define mating spherical surfaces for the spherical bearing surface 44 of socket member 42. Further, the core member 32b includes a plurality of alternating longitudinally extending ribs 52 and slots or grooves 54 which form a spline connection with oppositely configured and positioned spline ribs 56 and slots or grooves 58, respectively, on the inner periphery of sleeve member 32a of the same shaft section 32. The internal locking/driving pockets 48 are actually formed within ribs 56 of the sleeve member 32a. The core member 32b is prevented from shifting axially relative to the sleeve member 32a for each shaft section through the use of conventional means such as locking pins or welded connections (not shown). Articulated flexible shaft assemblies similar to the above are described in U.S. application Ser. No. 767,260 filed in the name of Horace M. Varner and assigned to The U.S. Government.

Figure 3:
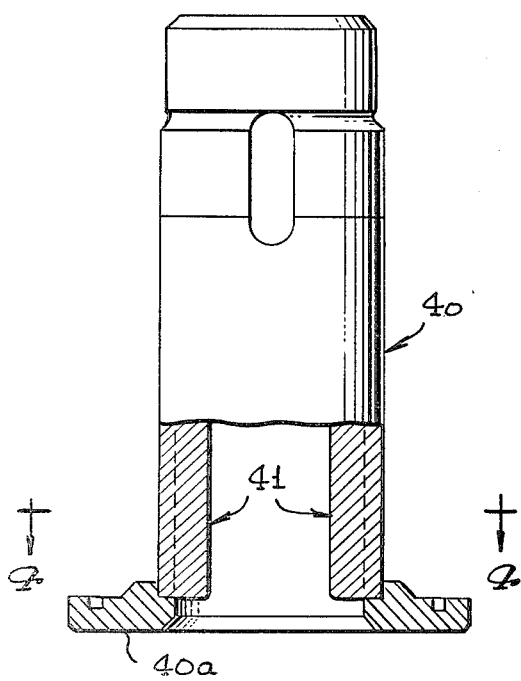
FIG. 3 is an elevation, partly in section, of a collar assembly incorporating my invention as used in the device of FIG. 1.

FIG. 3 is an elevation, partly in section, of the collar member 40 which is incorporated into the drill drive head 24 as shown in FIG. 1A. Welded to the wall of collar member 40 are the cam members 41. A flange 40a forming part of the collar member 40 provides means for locating and fastening collar 40 to the drive head assembly 24.

Figure 4:
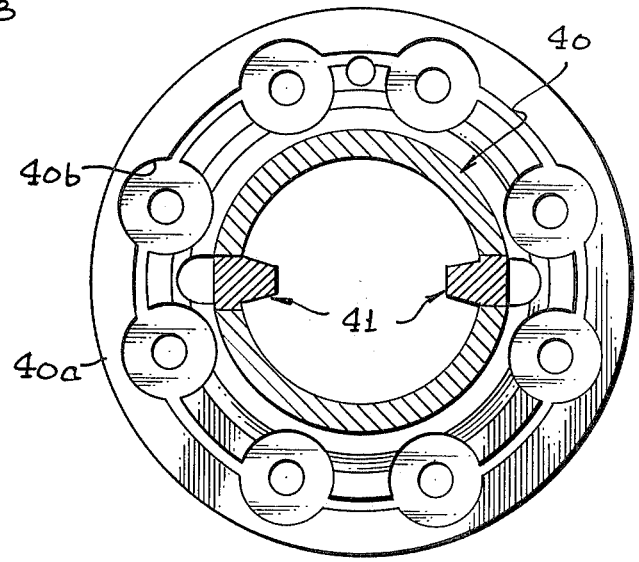
FIG. 4 is a sectional view taken along line 4—4 of FIG. 3.

FIG. 4 is a sectional view taken along line 4—4 of FIG. 3. In this view, the flange 40a is shown including a plurality of mounting holes 40b. Also visible in this view are the oppositely disposed cam members 41.

FIG. 5 is a plan view of the structure shown in FIGS. 3 and 4 and is also shown partially in section. In this view, it will be noted that the cam member 41 is welded into a longitudinal slot in the wall of collar member 40 and includes a tapered surface 41a near its left end which would be its uppermost end as installed as shown in FIG. 1A. A similar slot and cam are located 180° around the collar 40. More detail of the structure of cam member 41 is shown in FIGS. 6 and 7. In FIG. 6 it will be observed that the cam member 41 has substantial thickness at its base, and this base is welded into the slots in collar member 40. FIG. 7, which is a plan view, shows the oppositely directed cam surfaces of cam member 41.

FIGS. 8–11 are a series of schematic drawings showing the operation of the drill shaft as the individual drill sections 32 move upwardly past the cam surfaces 41. In FIG. 8 the drill is unlocked and the notches between the helical drill projections 60 which form a scroll for the removal of the cuttings are shown misaligned from section to section. FIG. 9 shows a number of the drill sections 32 as some of them have moved past or into engagement with cam 41. In this view the two upper drill sections are in radial alignment since the upper ramp of cam 41 has made contact with the right face 60a of the scroll on the upper part of said drill section. It will be recognized that as the drill sections 32 move upwardly relative to cam 41, the notch face 60b on the third section 32 will contact the rightwardly curving cam face on the upper end of cam 41, causing this drill section to be rotated such that it is aligned with the two upper sections. At the lower end of cam 41, the lower of the four drill sections has just made contact with face 41 which causes a partial rotation of this drill section in the same direction as the second section is rotated from contact with the rightwardly curving cam face at the upper end of cam 41.

FIG. 10 shows the drill shaft as it has been moved a greater distance upwardly past cam 41. In this view the right face 60b of the scroll has moved into contact with the rightwardly curving cam face, turning its drill section toward the right, as indicated by the arrow, and causing this section to be radially aligned with those above it. FIG. 11 shows the drill shaft with all sections aligned as for drilling.

Essentially the reverse of the above occurs when the drill shaft is moved downwardly to retract it. As the sections move past the upper end of cam 41, they are in alignment with the cam essentially filling the notches in the scrolls 60. As the shaft moves downwardly, each section in turn will make contact with the leftwardly curving cam ramp surface on the lower end of cam 41, thereby being forced to the left such that they are again articulated relative to each other.

The cam arrangement described above is suitable for use with a number of flexible shaft configurations as described in the application of Horace M. Varner referred to above. Other embodiments may occur to those skilled in the art in which a similar cam structure may be used, but there obviously must be a mechanical reference as to the radial position of the drill sections such as is provided by the scroll notch faces 60a, 60b, etc. for the cam surfaces to be acting against.

I claim:

1. In an articulated flexible shaft assembly and drive means therefor comprising:

a plurality of shaft sections, connecting means carried on the opposite ends of said shaft sections, said connecting means being interconnected to permit limited angular inclination between said shaft sections, means interposed between said connecting means of interconnected adjacent shaft sections to effect driving engagement between said shaft sections when one shaft section is rotated relative to the other and for causing said shaft sections to lock up in axially straight alignment when torqued in one direction and to transmit torque in the other direction with limited free angular inclination between said shaft sections, wherein the improvement comprises:

cam means forming part of said drive means and operatively engageable with each of said shaft sections as it is moved axially through said drive means in a first direction to rotate said shaft sections slightly to positively drive said shaft sections out of radial alignment to permit said limited free angular inclination between shaft sections.

2. An articulated shaft assembly as claimed in claim 1 wherein said drive means includes a collar member through which said shaft assembly passes as it is driven in either axial direction, said shaft sections include axially directed slots and said cam means includes a pair of cam members oppositely disposed on the interior surface of said collar member engageable with said slots and having oppositely directed ramp surfaces to cause relative radial movement between adjacent shaft sections.

3. An articulated shaft assembly as claimed in claim 2 wherein said cam members each comprise an elongated key member over which said slots are moved to control radial alignment of said shaft members and having oppositely directed projections having ramp surfaces at each end thereof.

4. In an articulated flexible shaft assembly and drive means therefor comprising:

a plurality of shaft sections, ball and socket members of adjacent shaft sections being interconnected to form an axially articulated, universal joint assembly, and means interposed between the ball and socket members of said interconnected, adjacent shaft sections to effect driving engagement between said shaft sections when one shaft section is rotated relative to the other, means interposed between said ball and socket members of said interconnected adjacent shaft sections for causing said shaft sections to lock up in an axially straight alignment when torqued in one direction and to transmit torque in the other direction with limited, free angular inclination between said shaft sections, and axially aligned notch means on the exterior surfaces of said shaft sections, wherein the improvement comprises a collar member forming part of said drive means through which said shaft assembly, and cam means in said collar member aligned in said notch means including a ramp surface operative to cause each of said shaft sections to be rotated slightly relative to its adjacent section to thereby cause any sections which are locked together in axial alignment to be released to permit said free angular inclination.

5. An articulated shaft assembly as claimed in claim 1 wherein said cam means also engages each of said shaft sections as it moves through said drive means in the opposite axial direction to drive each said shaft section slightly radially to cause said sections to lock up in axially straight alignment.

6. An articulated shaft assembly as claimed in claim 4 wherein said cam means also engages each of said shaft sections as it moves through said drive means in the opposite axial direction to drive each said shaft section slightly radially to cause said sections to lock up in axially straight alignment.

7. A articulated shaft assembly as claimed in claim 6 wherein said cam members each comprise an elongated key member over which said slots are moved to control radial alignment of said shaft members and having oppositely directed projections having ramp surfaces at each end thereof.

* * * * *